United States Patent [19]

McGrath

[11] 4,003,729

[45] Jan. 18, 1977

[54] AIR CONDITIONING SYSTEM HAVING IMPROVED DEHUMIDIFICATION CAPABILITIES

[75] Inventor: William L. McGrath, Naples, Fla.

[73] Assignee: Carrier Corporation, Syracuse, N.Y.

[22] Filed: Nov. 17, 1975

[21] Appl. No.: 632,330

[52] U.S. Cl. .................................. 62/93; 62/186
[51] Int. Cl.² .................................... F25D 17/06
[58] Field of Search ............. 62/93, 176, 186, 208, 62/180, 216

[56] References Cited
UNITED STATES PATENTS

| | | | |
|---|---|---|---|
| 2,959,929 | 11/1960 | McGrath | 62/186 X |
| 3,633,376 | 1/1972 | Miner | 62/181 |

Primary Examiner—William E. Wayner
Attorney, Agent, or Firm—J. Raymond Curtin; Barry E. Deutsch

[57] ABSTRACT

An air conditioning system includes a mechanical refrigeration unit having a control to vary the dehumidifying capabilities of the system. The speed of the fan provided to route air in heat transfer relationship with the evaporator of the refrigeration unit is varied to vary the flow rate of the air across the evaporator. When it is desired to increase the dehumidifying capabilities of the system, the flow rate of the air is reduced. The temperature of the evaporator is monitored to decrease the flow rate of the air thereacross as the temperature of the refrigerant flowing through the coil increases and to increase the flow rate of the air across the evaporator as the refrigerant temperature decreases, to thereby maintain the refrigerant temperature in the evaporator at a predetermined level.

11 Claims, 5 Drawing Figures

AIR CONDITIONING SYSTEM HAVING IMPROVED DEHUMIDIFICATION CAPABILITIES

BACKGROUND OF THE INVENTION

This invention relates to air conditioning systems employing mechanical refrigeration units, and in particular to such a system having improved dehumidification capabilities.

It is well recognized that in many geographical areas, a proper air conditioning system should not only lower the temperature of the space being served when the temperature therein has exceeded a predetermined level, but should also decrease the relative humidity of the space even though the temperature therein may not have exceeded the predetermined level. Very often, the typical air conditioning system relies solely on temperature reduction whereby the conditioned air temperature is lowered beneath its dew point to achieve any absolute humidity reduction. If the dew point is not reached, the mere lowering of the temperature of the conditioned air will actually result in an increase in the relative humidity. High relative humidity creates not only human discomfort, but in addition permits mildew and other types of fungi to form on furniture, clothing, etc.

It has been recognized that a lowering of the cooling or evaporator coil temperature will not only result in an increased sensible heat reduction, i.e. a reduction of the conditioned air temperature, but will also result in an increase in the latent heat reducing capabilities of the system, i.e. removal of water vapor from the air. The increase in the latent heat reducing capabilities in proportion to the accompanying increase in sensible heat cooling will be even greater.

A variation in the velocity of air across the cooling coil or evaporator will also vary the proportion of sensible heat reduction to latent heat reduction. In effect, by lowering the flow rate of the air across the coil, a reduction will occur in the sensible heat load imposed on the system; that is, less heat will be transferred to the refrigerant of the system thereby lowering its pressure and temperature. As noted before, lowered refrigerant temperature results in increased dehumidification capabilities for the system. The reduced air flow rate results in the air temperature decreasing to a lower level. The lower temperature level approaches the temperature of the refrigerant flowing through the evaporator coil whereby the moisture content of the air is further reduced due to the lower dew point. Hence, various arrangements have been proposed for lowering the flow rate of the air across the cooling coil when dehumidification is required in the absence of a need for sensible heat reduction. The reduced air flow results in a closer approach of the dew point temperature of the effluent air to the refrigerant temperature within the coil thus further reducing power requirements for dehumidifying.

Additionally, by reducing the speed of the fan provided to route air in heat transfer relation with the evaporator and thus lowering the temperature of the refrigerant flowing therethrough, the power consumed will be substantially reduced in removing the same amount of moisture from the air. It has been mathematically determined that a reduction in refrigerant temperature from 44° F to 30° F will result in almost a 300% increase in the amount of moisture that may be removed for the same amount of sensible heat cooling. Thus, to remove the same amount of moisture, an air conditioning system operating at the lower temperature need operate for only one third the period of time when compared to a system operating at the higher refrigerant temperature. When operating in a dehumidifying mode with the air conditioning system operating for example only one third the time, the dry bulb temperature may rise. A rise in dry bulb temperature will actually result in a decrease in the relative humidity, thereby further decreasing the need to operate the air conditioning system to maintain a desired relative humidity. Since, it is contemplated that the dehumidifying mode of operation will be typically employed when the air conditioned space is unoccupied, the rise in dry bulk temperature will not cause human discomfort. If the dry bulb temperature is allowed to rise when on the dehumidifying mode, such rise in dry bulb temperature further reduces the relative humidity resulting in much less power consumption as compared to contemporary practice, in order to maintain the same relative humidity.

Examples of the prior art are illustrated in U.S. Pat. Nos. 2,236,058; 2,296,530; 2,685,433; and 3,251,196. While each of the prior art systems reduce the flow rate of the air when relative humidity reduction is desired, each of the systems illustrate complex arrangements for achieving the foregoing. In addition, none of the systems directly or indirectly monitor the temperature of refrigerant in the evaporator, and if the temperature of the refrigerant is reduced below a predetermined level, moisture or condensate formed thereon will freeze. The formation of large quantities of frost on the surface of the evaporator coil reduces the efficiency of operation of the air conditioning system or renders it inoperable and is therefore undesirable.

SUMMARY OF THE INVENTION

Accordingly, it is an object of this invention to provide an air conditioning system having improved dehumidification capabilities.

It is a further object of this invention to monitor the cooling coil temperature and to regulate the veloctiy of the air flow thereover to maintain a desired minimum coil temperature.

It is yet another object of this invention to monitor cooling coil temperature and to decrease the flow of air thereover as the coil temperature increases and to increase the flow of air thereover as coil temperature decreases below a predetermined level to obtain maximum dehumidification, at minimum energy usage.

It is still another object of the present invention to discontinue operation of the air conditioning system if the temperature in the space decreases below a predetermined level.

It is a further object of this invention to vary the speed of a fan provided to route air over an evaporator in accordance with temperature conditions in a space, yet maintain the flow of air over the evaporator at a minimum to prevent condensate formed on the coil from freezing.

These and other objects of the present invention are attained in an air conditioning system having a mechanical refrigeration unit. The fan is provided to route air in heat transfer relationship with the evaporator of the refrigeration unit. Temperature responsive means are provided to monitor the temperature of the refrigerant passing through the evaporator. As contemplated herein, the term "temperature responsive means" refers to devices provided to directly sense the refrigerant temperature, for example a temperature responsive resistance device, or to devices provided to indirectly sense the refrigerant temperature, for example a device responsive to the saturated refrigerant pressure. A control signal is generated in response to the sensed refrigerant temperature. The magnitude of the control signal varies in accordance with changes in the sensed temperature. The variable magnitude control signal is supplied to the fan actuating means to vary the speed of the fan whereby the speed of the fan is increased as the sensed refrigerant temperature decreases below a predetermined level and the speed of the fan is decreased as the sensed refrigerant temperature increases above the predetermined level. Coil temperature is maintained at a minimum level to achieve maximum dehumidification.

DESCRIPTION OF THE PREFERRED EMBODIMENTS

Referring now to the drawings, there is disclosed preferred embodiments of the instant invention. In referring to the various figures of the drawings, like numerals shall refer to like parts.

Figure 1:
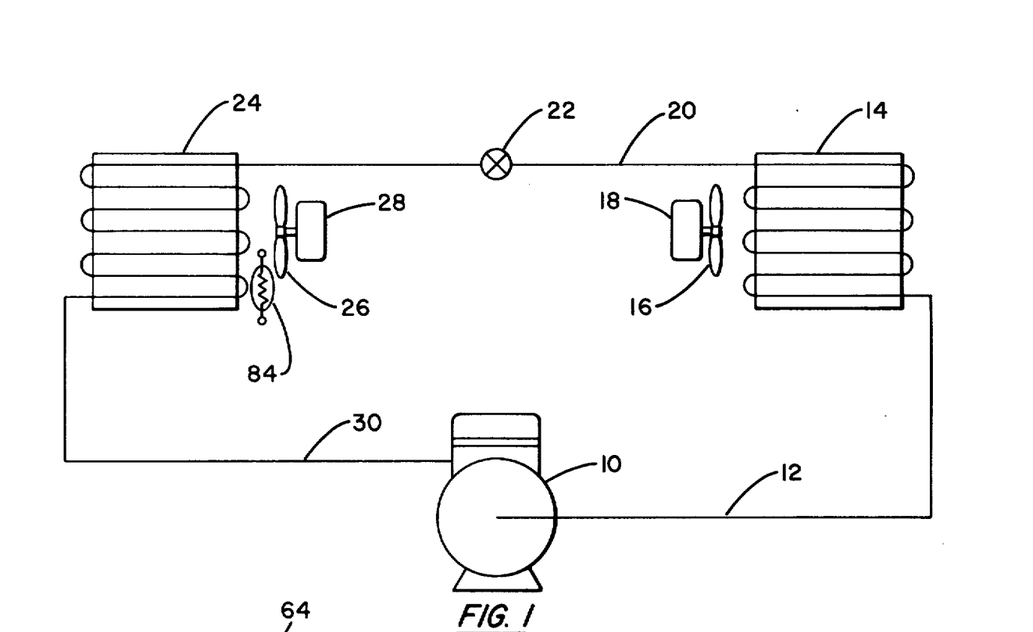
FIG. 1 is a schematic illustration of a mechanical refrigeration unit of the type employed in an air conditioning system of the present invention.

Referring particularly to FIG. 1, there is disclosed an air conditioning system including a mechanical refrigeration unit of the type to which the present invention pertains. The refrigeration unit includes a refrigerant compressor 10 disclosed as a reciprocating compressor. Gaseous refrigerant, at a relatively high pressure, is discharged from compressor 10 via conduit 12 to a first heat exchanger 14 serving as a condenser. A cooling medium, for example, ambient air, is routed over the surface of condenser 14 in heat transfer relation with the vaporous refrigerant flowing therethrough. The vaporous refrigerant rejects heat to the ambient air and is condensed thereby. A fan 16 suitably connected to a motor 18 is provided to supply the ambient air. Obviously, water may be used as the heat sink for condenser 14, in lieu of ambient air.

The condensed refrigerant flows from condenser 14 through line 20 and expansion device 22, shown as a thermal expansion valve, to a second heat exchanger coil 24. Coil 24 functions as an evaporator. Air to be conditioned, is routed via a fan 26 in heat transfer relation with the refrigerant flowing through evaporator 24. The refrigerant absorbs heat from the air and is vaporized thereby. The vaporous refrigerant is returned via conduit 30 to compressor 10. Fan 26 is suitably connected to an electric motor 28. The cooled air is supplied to the space being conditioned by suitable means not shown. The air conditioning system thus described is conventional within the art and no further explanation is deemed necessary.

Figure 2:
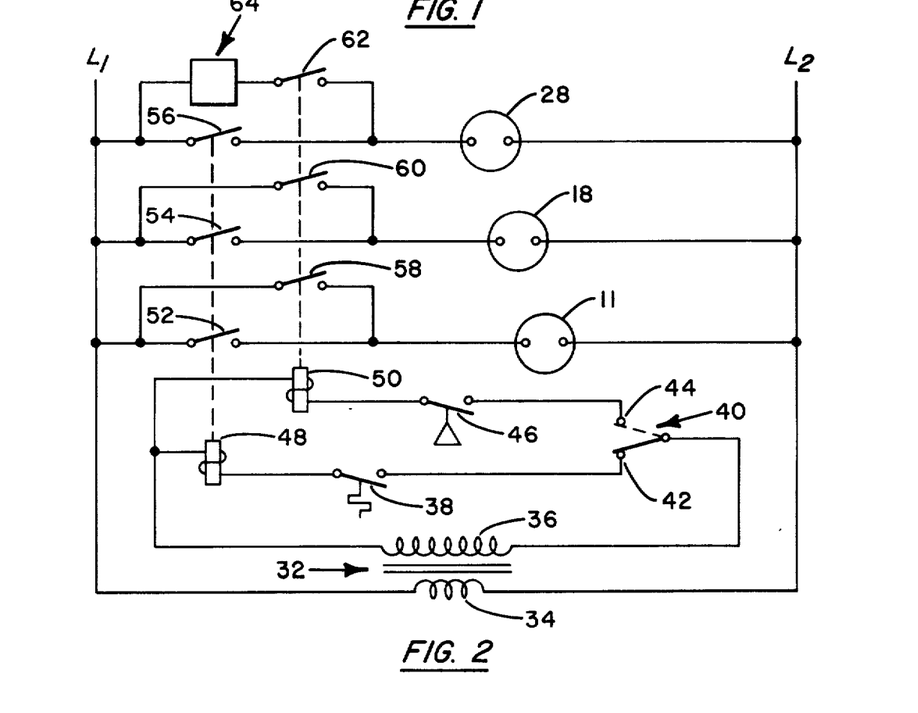
FIG. 2 is a schematic diagram of a control in accordance with the present invention.

Referring now to FIG. 2, there is shown a first preferred form of control in accordance with the instant invention. The control is suitably connected to a source of electric power represented by line L-1 and L-2. The control further includes a transformer 32 having a primary winding 34 and a secondary winding 36. A thermostatically controlled switch 38 is connected in series with a control relay 48 and a first position 42 of a single pole double throw switch 40. A humidistat 46 is connected in parallel with thermostatic switch 38. A control relay 50 is connected in series with humidistat 46, as is a second position 44 of switch 40. The energization of control relay 48 results in the closing of normally open switches 52, 54 and 56 respectively connected in series with compressor motor 11, condenser fan motor 18 and evaporator fan motor 28.

The energization of relay 50 results in the closing of normally open switches 58, 60, and 62 respectively disposed in series with compressor motor 11, fan motor 18 and evaporator fan motor 28. Switches 58, 60 and 62 are disposed in parallel with switches 52, 54, and 56. A phase control device 64, to be more fully described hereinafter, is connected in series with switch 62.

Briefly, switch 40 permits either thermostatic switch 38 or humidistat 46 to control the energization of the air conditioning system. With switch 40 set in the solid line first position illustrated in FIG. 2, the closure of switch 38 will energize relay 48 thereby closing switches 52, 54, and 56 to energize the motors connected in series therewith. Humidistat 46 will not effect operation of the system at this time.

With switch 40 in its dotted line second position as shown in FIG. 2, thermostatic switch 38 will be inoperative and the air conditioning system will function under the control of humidistat 46. The closure of the humidistat will energize relay 50 thereby closing switches 58, 60, and 62. The closure of these switches will also cause the energization of electric motors 11, 18, and 28, the one significant difference being that motor 28 will be connected to the source of power through phase control device 64 for a reason to be more fully explained hereinafter. Briefly, control device 64 causes fan motor 28 to operate at a variable speed.

Figure 3:
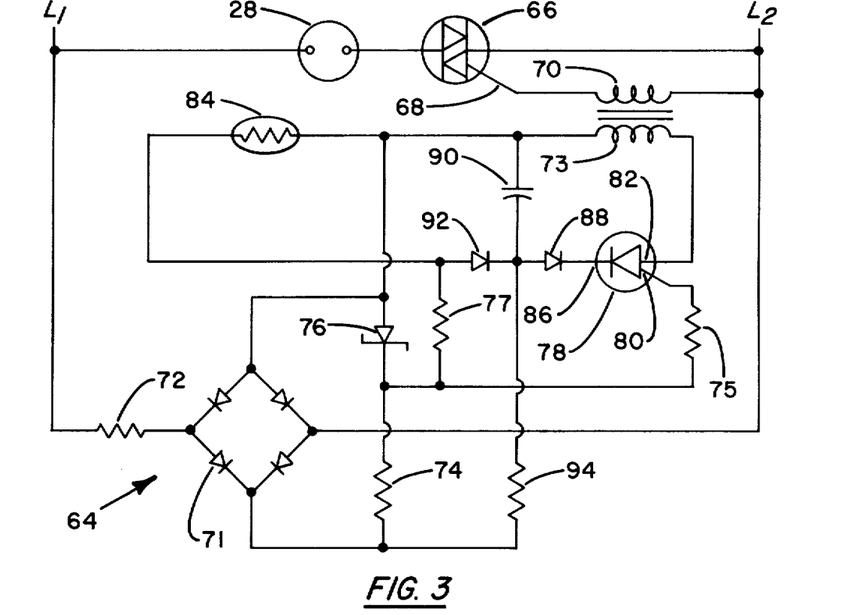
FIG. 3 is a schematic diagram of an electrical phase control device which may be employed with the present invention.

Referring now to FIG. 3, there is shown a schematic diagram of a preferred form of phase control device 64. Phase control device 64 includes a switch 66 which functions to connect motor 28 to the source of electrical current. Switch 66 is preferably a bi-directional gated solid-state switch of a type sold under the trademark "TRIAC". Switch 66 is provided with a gate 68 in series with a secondary winding 70 of a pulse transformer by which the switch is triggered to a conducting state by either a positive or negative pulse being applied to the gate. Switch 66 should be sufficiently fast in operation so that it may be switched on during any desired portion of each half cycle of alternating current supplied to motor 28 to arrive at a desired average voltage, so that the motor speed and consequent fan speed is varied in a desired manner.

Phase control device 64 further includes a full wave diode rectifier circuit 71. Rectifier circuit 71 is connected in series with dropping resistor 72 to provide a source of DC voltage across a series connected resistor 74 and zener diode 76. It will be appreciated zener diode 76 has a very low resistance characteristic such that it provides a constant voltage drop across its terminals. A series circuit comprising unijunction transistor 78 having one base 80 connected in series with resistor 75 and another base 82 connected in series with primary winding 73 of the pulse transformer is connected across zener diode 76 which provides a constant voltage to the series circuit.

The circuit further includes a temperature responsive variable resistance element 84 provided to sense the temperature of the refrigerant flowing through evaporator 24 (See FIG. 1). Element 84 is preferably a negative temperature coefficient thermistor. Element 84 and resistor 77 form a voltage divider, with element 84 being in the lower portion of the divider network. Preferably resistance device 84 is positioned on a selected one of the return bends of the evaporator coil at a point representing the coldest portion of the coil. Thermistor 84 is designed so that the resistance thereof will decrease as the temperature of the refrigerant increases above a preset temperature which may be selected at approximately 30° F. However, the range for the preselected temperature may vary between 25° F to 37° F. Although, at 25° F, a thin layer of frost will probably form on the surface of evaporator 24, it is believed that a thin layer of frost will not result in inefficient operation of the air conditioning system. However, should the frost reduce the air flow across the evaporator to an undesirably low rate, the resulting reduction in refrigerant temperature will be sensed by resistance device 84. Resistance device 84 operates to provide a voltage signal, the magnitude thereof being related to the temperature of the refrigerant flowing through the evaporator coil.

Emitter 86 of unijunction transistor 78 is connected through a diode 88, which prevents leakage current from charging a capacitor 90. Additionally, the circuit includes diode 92 which permits a "pedestal" voltage to charge capacitor 90 within a very short period of time. A resistor 94 is connected in series with capacitor 90. Capacitor 90 and resistor 94 combine to provide a "fixed ramp" voltage signal to transistor 78 as is obvious to those skilled in the art. Diode 92 also permits the "ramp" signal to rise above the pedestal signal. It may be desirable in practice to add various additional circuits to prevent spurious gating of switch 66.

It will be appreciated that the circuit shown is generally illustrative of a phase control type of motor speed control. The circuit shown is merely illustrative of one type of motor speed control system, and other types of motor speed controls can be adapted to this invention. Particularly, mechanical speed control systems utilizing variable sheaves may be employed in lieu of the electronic control described above.

In operation, switch 66 is in a nonconducting state, and motor 28 is deenergized until a pulse is supplied to gate 68. A charge is built on charging capacitor 90 at a rate which is determined by the resistance of resistor 94. Since resistor 94 is fixed, the charging rate of capacitor 90 is fixed. When the charge on capacitor 90 reaches a predetermined value, a predetermined voltage signal is supplied to transistor 78. This signal is referred to as the "ramp" voltage. The magnitude thereof is insufficient to initially place transistor 78 in its conductive state. To the ramp is added a second voltage signal, which is known as the "pedestal". The magnitude of the "pedestal" voltage is variable and is dependent upon the temperature of the refrigerant flowing through evaporator 24. With thermistor 84 being placed in the lower portion of the voltage divider, a decrease in resistance resulting from an increase in refrigerant temperature will reduce the magnitude of the pedestal signal; whereas a decrease in refrigerant temperature, which will cause an increase in the resistance of element 84, will increase the pedestal signal. When the combined ramp and pedestal signal reach a predetermined value, transistor 78 becomes conductive, discharging a pulse through primary winding 73 of the pulse transformer. A pulse is thereby induced in secondary winding 70 of the pulse transformer, which is applied to gate 68 of switch 66, causing the switch to conduct.

Switch 66 is preferably a solid-state device having the characteristic that once it is turned on by a pulse being applied to gate 68, it remains in its conductive state until the current through the device becomes zero. Consequently, switch 66 remains conductive after a pulse is applied to gate 68 until the end of the half cycle of alternating current during which it begins conducting. The value of the electrical components are chosen so that switch 66 is turned on for a time during each half cycle by the control circuit such that the power supplied to motor 28 is sufficient to rotate fan 26 at a speed which provides the desired air flow over heat exchange coil 24. Since the variable resistance device 84 is of the NTC type, its resistance goes down as refrigerant temperature increases. Thus, when the refrigerant temperature is above a preselected point, for example 30° F, the resistance of thermistor 74 decreases. The pedestal voltage is therefore relatively small in magnitude, and transistor 78 is placed in its conducting state at a relatively late point in the AC half-cycle power supply, thereby decreasing the current flow through fan motor 28 to decrease the speed thereof. Conversely, as the refrigerant temperature drops below 30° F, the resistance of element 84 increases to increase the magnitude of the pedestal voltage to thereby place transistor 78 in its conducting state at an earlier point in the AC half-cycle to increase the speed of fan 26.

OPERATION

Referring particularly to FIG. 2, switch 40 is in its dotted line or second position. Thus, energization of the air conditioning system is under control of humidistat 46. When the humidistat closes in response to the humidity in the space being conditioned exceeding a predetermined level, coil 50 is energized thereby closing switches 58, 60, and 62. Closure of the several switches energizes compressor motor 11, condenser fan motor 18 and evaporator fan motor 28.

As previously noted, it has been recognized that a greater amount of dehumidification can be obtained if the air to be conditioned is passed at a slower rate over the surface of the evaporator coil. Thus, when the control is functioning in its dehumidification mode in response to humidistat 46, the closure of swtich 62 places phase control device 64 in series with evaporator fan motor 28. Accordingly, the speed of the fan will be varied in accordance with the sensed refrigerant temperature. If the thermistor senses that refrigerant temperature passing through the coil is increasing, the phase control device functions to reduce the pedestal voltage supplied to transistor 78 whereby switch 66 is placed in its conducting state later in the AC half voltage cycle to decrease the speed of the fan.

By lowering the fan speed, a reduced sensible heat load is imposed on the refrigerant whereby the temperature of the refrigerant is descreased. The phase control device will function to maintain the speed of fan motor 28 at a level whereby the temperature of the refrigerant passing through evaporator 24 will stabilize at a predetemined level, for example 30° F.

If the temperature of the refrigerant were to fall below the predetermined level, phase control device 64 will cause the pedestal voltage signal to increase to cause switch 66 to be placed in its conducting state earlier in the AC half voltage cycle. Accordingly, the flow rate of the air over evaporator 24 will increase, resulting in the desired increase in refrigerant temperature.

It should be understood, a pressure sensitive device, responsive to the saturated pressure of the refrigerant flowing through evaporator 24 may be employed in lieu of temperature responsive resistance element 84. The pressure responsive device would provide an indirect indication of the refrigerant temperature as refrigerant pressure and temperature are directly related. If a pressure responsive device is employed, such device could provide a control signal to a variable resistor to alter the resistance thereof in accordance with pressure (temperature) changes of the refrigerant in the evaporator.

Figure 4:
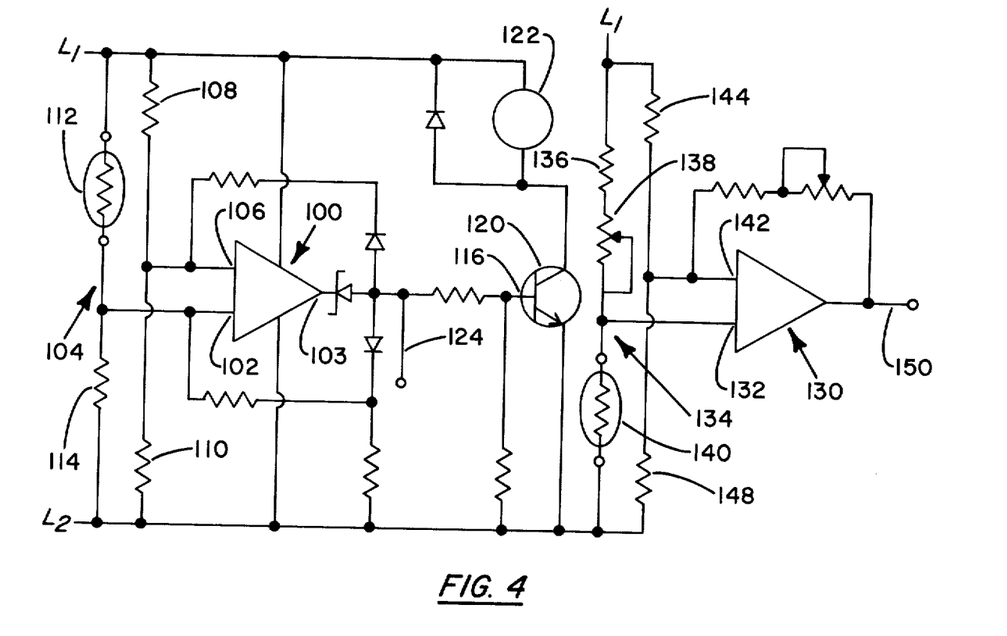
FIG. 4 is a schematic diagram of a portion of a modified form of the present invention.
Figure 5:
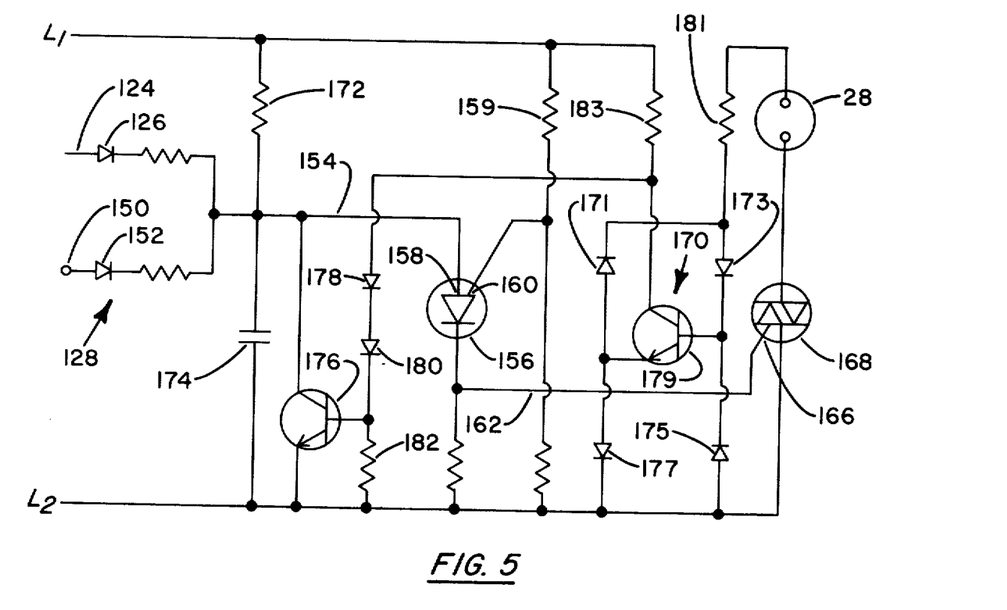
FIG. 5 is a schematic diagram of the remaining portion of the modified form of the invention.

Referring now to FIGS. 4 and 5 of the drawings, there is disclosed an alternate embodiment of the instant invention. For purpose of simplification and to avoid unnecessary redundancy, the mechanical refrigeration unit is not disclosed. However, it should be understood the mechanical refrigeration unit is identical to the unit disclosed in FIG. 1, unless otherwise indicated.

The illustrated electronic control includes an operational amplifier 100 having a first input 102 connected to a voltage divider 104. Amplifier 100 has a second input 106 connected between a pair of fixed resistors 108 and 110. The fixed resistors provide a fixed magnitude voltage signal to input 106 of amplifier 100. Voltage divider 104 has a first variable resistance device 112 in the top half of the divider network and a fixed resistance 114 in the bottom half of the network. Variable resistance device 112 is preferably a negative temperature co-efficient thermistor and is provided to sense room temperature. The output signal from amplifier 100 is provided to the base 116 of transistor 120. Transistor 120 is connected in series with a control relay 122. In addition, the output from operational amplifier 100 is provided through line 124 to the input of one diode 126 of a diode comparator circuit 128 shown in FIG. 5.

The control illustrated in FIG. 4 further includes a second operational amplifier 130. A first input 132 to amplifier 130 is connected to the source of electrical power through a voltage divider network 134. Voltage divider network includes first and second resistors 136 and 138 connected in the top portion of the voltage divider circuit and a temperature responsive resistance device 140 connected in the bottom half of the voltage divider network. Temperature responsive resistance device 140 preferably is a negative temperature co-efficient thermistor and is responsive to the temperature of the refrigerant flowing through evaporator 24. Device 140 is preferably identical to device 84.

Amplifier 130 has a second input 142. The voltage signal supplied to input 142 is of a fixed magnitude as determined by resistors 144 and 148. The output 150 from operational amplifier 130 is provided to diode 152 of diode comparator circuit 128.

The diode comparator circuit receives the control signals from the output of each operational amplifier 100 and 130 and selects the larger thereof and supplies the same to base 158 of unijunction transistor 156. As shall be explained more fully hereinafter, the signal supplied from comparator circuit 128 is of variable magnitude. This signal is a variable magnitude pedestal signal. The control further includes a fixed resistor 172 and a capacitor 174 which provide a fixed magnitude ramp signal to base 158 of transistor 156. Transistor 156 further has a fixed signal supplied to gate 160 through resistor 159. When the signal at base 158 exceeds the signal at gate 160 by a predetermined magnitude, the transistor is placed in its conductive state.

When transistor 156 is placed in a conductive state, a pulse is supplied to gate 166 of switch 168. Preferably, switch 168 is a "triac" of a type similar to switch 66 shown in FIG. 3. Switch 168 is in series with evaporator fan motor 28. Accordingly, switch 168 functions in a similar manner to switch 66. The portion of the control illustrated in FIG. 5 further includes synchronizing elements which insure that the ramp signal is returned to null at the cross-over point of each half cycle of the AC power supply. The synchronizing elements include transistors 170 and 176 and diodes 171, 173, 175, 177, 178 and 180, and resistors 181, 182 and 183.

OPERATION

The manner in which the control disclosed in FIGS. 4 and 5 functions shall now be explained in detail. Temperature responsive resistance device 112 is shown as a negative temperature co-efficient thermistor. Thus, as room temperature increases above a predetermined level, the resistance of device 112 will decrease. The control signal supplied via device 112 to input 102 of operational amplifier 100 will thus increase in magnitude. When the magnitude of such signal exceeds the value of the magnitude of the fixed control signal to second input 106 of amplifier 100, the amplifier will be placed in a conducting state. The magnitude of the resultant control signal from the output 103 of amplifier 100 will vary as a function of temperature in the space being conditioned. Thus, as the temperature increases above a predetermined value, the magnitude of the control signal at output 103 of amplifier 100 will similarly increase. The control signal will be transmitted to base 116 of transistor 120 to place the transistor in a conducting state to thereby energize relay 122. The energization of relay 122 will close switches 52 and 54 (shown in FIG. 2) to energize respectively compressor fan motor 11 and condenser fan motor 18. Evaporator fan motor 28 has been previously energized by the closure of switch 56 by separate means. The resulting energization of the compressor and condenser fan motors renders the refrigeration unit operational which results in a lowering of the conditioned air temperature.

As noted previously, thermistor 140 is provided to sense the temperature of the refrigerant in evaporator coil 24. Since device 140 is preferably a negative temperature co-efficient thermistor, the resistance thereof will increase on a decrease in refrigerant temperature. However, if the room temperature has increased above a predetermined level to thereby cause operation of the refrigeration unit, the temperature of the refrigerant will be at a relatively high level. Accordingly, the resistance of thermistor 140 is at a relatively low level. Since the thermistor is provided in the lower half of voltage divider network 134, any decrease in resistance will lower the control signal supplied to input 132 of operational amplifier 130. Accordingly, the constant magnitude signal applied to input 142 of the amplifier will be of a higher value than the signal applied to input 132, thereby maintaining the operational amplifier in an off or nonconducting state. Accordingly, no signal will be transmitted to diode 152 of comparator means 128. The signal generated by comparator means 128 will be equal in magnitude to the signal transmitted by operational amplifier 100. This signal is delivered to input 158 of unijunction transistor 156. When the magnitude of the signal at input 158 exceeds the magnitude of the signal at gate 160, the transistor is placed in its conducting state whereby a pulse is transmitted through line 162 to gate 166 of triac 168. The triac is thus placed in its conducting state to cause the fan motor 28 to operate. As previously indicated, the speed of fan 26 is directly proportional to the signal transmitted from amplifier 100, and the magnitude of such signal is directly proportional to the sensed room temperature. By causing the air to flow over the evaporator at a relatively high rate, a relatively large sensible heat reduction of the supply air temperature will be obtained.

As the temperature in the space being conditioned decreases, the resistance of thermistor 112 will similarly increase. Accordingly, the magnitude of the control signal generated by operational amplifier 100 will decrease. However, since the temperature of the refrigerant is still at a relatively high level, the signal transmitted from operational amplifier 100 will be still greater in magnitude than the signal transmitted from operational amplifier 130. Thus, the operation of fan 26 and motor 28 will still be controlled in accordance with sensed room temperature. However, due to the reduced magnitude pedestal signal transmitted through diode 126, motor 28 will be energized during a later portion of each half cycle of the AC power supply and thus will be rotating at a slower rate. Accordingly, the dehumidification capabilities of the system are increasing, while the sensible heat reducing capabilities of the system are decreasing.

If the refrigerant temperature in evaporator 24 falls below a predetermined value, as a result of fan speed being reduced to a minimum level as the temperature in the space approaches or drifts below the set-point, the resistance of thermistor 140 will substantially increase, thereby increasing the control signal transmitted from operational amplifier 130. Similarly, the magnitude of the control signal transmitted from operational amplifier 100 will fall to a relatively low value due to the lowered temperature in the space. Accordingly, the signal transmitted by diode comparator circuit 128 will be the signal transmitted from operational amplifier 130. If the temperature of the refrigerant falls below a predetermined value, whereby a relatively large magnitude signal is thus generated, the signal transmitted by diode 152 to input 158 of transistor 156 will likewise assume a relatively large value. Accordingly, the transistor will be turned on earlier in the AC half cycle power supply to thereby place triac 168 in its conducting state earlier in the half cycle of AC power supply to increase the speed of fan 26.

The foregoing will prevent the refrigerant temperature from falling below the predetermined value, irrespective of the sensed room air temperature to prevent condensate formed on the surface of the coil from freezing.

As a consequence of the increased fan speed to prevent coil freezing, the temperature in the space being conditioned may fall below the predetermined value, whereby the control signal transmitted by operational amplifier 130 will approach null. Accordingly, the signal transmitted to transistor 120 will also approach null, whereby the transistor will be placed in its nonconducting state. Relay 122 will thus be deenergized thereby opening switches 52 and 54 to discontinue operation of the compressor and condenser fan motors. The mechanical refrigeration unit will remain in its off state until the temperature in the space rises to a level whereby transistor 120 will again become conducting.

The above described air conditioning system provides total comfort with both sensible and latent heat reducing capabilities being fully utilized. In addition, the foregoing system achieves such total comfort without introducing any problems heretofore encountered as a result of decreasing the flow of air across the evaporator. While electronic controls have been specifically shown, it should be particularly understood that electrical or pneumatic devices may be substituted therefore without departing from the spirit of the instant invention.

While preferred embodiments of the instant invention have been disclosed and illustrated, the invention should not be limited thereto, but may be otherwise embodied within the scope of the following claims.

I claim:

1. In an air conditioning system including a mechanical refrigeration unit having a fan to route air in heat transfer relationship with the evaporator and actuating means to drive said fan, a control system to increase the dehumidifying capabilities of said system comprising:
    temperature responsive means to sense the temperature level of the refrigerant passing through the evaporator coil;
    means to generate a control signal in response to said sensed refrigerant temperature including means to vary the magnitude of said signal as the sensed refrigerant temperature varies;
    means to supply said variable magnitude control signal to said fan actuating means to vary the speed of said actuating means and thus the speed of said fan, whereby the speed of said fan is decreased as the sensed refrigerant temperature increases to decrease the flow rate of the air across the evaporator, and the speed of the fan is increased as the sensed refrigerant temperature decreases to increase the flow rate of air across the evaporator to maintain a substantially constant refrigerant temperature;
    means to sense the temperature level of the air in the space being served by said air conditioning system;
    means to generate a second control signal in response to said sensed air temperature including means to vary the magnitude of said second signal as the sensed air temperature varies;
    means to supply said second variable magnitude control signal to said fan actuating means to vary the speed of said fan; and
    monitoring means to determine the magnitude of said second control signal including means to discontinue operation of said refrigeration unit if the magnitude of said second control signal is indicative of the air temperature having fallen below a predetermined value.

2. In an air conditioning system including a mechanical refrigeration unit including a fan to route air in heat transfer relationship with the evaporator of said refrigeration unit; and actuating means to drive said fan, a control system to increase the dehumidifying capabilities of said system comprising:

temperature responsive variable resistance means disposed in heat transfer relation with the evaporator of the refrigeration unit to monitor the temperature level of the refrigerant flowing therethrough;

means to generate a control signal in response to said monitored refrigerant temperature, including means to vary the magnitude of said signal in response to variations in the monitored refrigerant temperature;

means to supply said variable magnitude control signal to said fan actuating means to vary the speed of said fan, whereby the speed of the fan is decreased as the monitored refrigerant temperature increases to decrease the flow rate of the air across the evaporator, and the speed of the fan is increased as the monitored temperature decreases to increase the flow rate of the air across the evaporator, the flow rate of the air being maintained at a sufficient level to prevent said refrigerant from decreasing below a predetermined temperature;

second temperature responsive variable resistance means to sense the temperature level of the air in the space being served by said air conditioning system;

means to generate a second control signal in response to said sensed air temperature, including means to vary the magnitude of said second signal as the sensed air temperature varies;

means to supply said second control signal to said fan actuating means to vary th speed of said fan; and monitoring means to determine the magnitude of said second control signal including means to discontinue operation of said refrigeration unit if the magnitude of said second control signal is indicative of the air temperature having decreased below a predetermined value.

3. In an air conditioning system in accordance with claim 2 further including:

second temperature responsive variable resistance means to sense the temperature level of the air in the space being served by said air conditioning system;

means to generate a second control signal in response to said sensed air temperature, including means to vary the magnitude of said second signal as the sensed air temperature varies;

means to supply said second control signal to said fan actuating means to vary the speed of said fan; and monitoring means to determine the magnitude of said second control signal including means to discontinue operation of said refrigeration unit if the magnitude of said second control signal is indicative of the air temperature having decreased below a predetermined value.

4. A method of operating an air conditioning system, including a mechanical refrigeration unit, to increase the dehumidifying capabilities of said system comprising the steps of:

propelling air to be conditioned in heat transfer relation with refrigerant flowing through the evaporator of the refrigeration unit, with the air rejecting heat to the refrigerant;

monitoring the temperature of the refrigerant flowing through the evaporator;

generating a control signal, with the magnitude thereof varying as the monitored refrigerant temperature varies;

supplying the variable magnitude control signal to the air propelling device to vary the speed of the device whereby the speed of the device is increased to increase the flow rate of the air across the evaporator as the refrigerant temperature decreases below a predetermined level, and the speed of the device is decreased to decrease the flow rate of the air across the evaporator as the refrigerant temperature increases above a predetermined level;

sensing the temperature of the air in the space being conditioned;

generating a second control signal in response to the sensed air temperature, with the magnitude of the signal varying in response to changes in sensed air temperatures;

supplying a second control signal to the air routing device to vary the speed of the device to vary the rate of flow of air in heat transfer relation with the evaporator; and monitoring the second control signal to determine the magnitude thereof to discontinue operation of the air conditioning system if the magnitude of the second control signal is indicative of the air temperature having decreased below a predetermined value.

5. A method in accordance with claim 4 further comprising the steps of:

sensing the temperature of the air in the space being conditioned;

generating a second control signal in response to the sensed air temperature, with the magnitude of the signal varying in response to changes in sensed air temperature;

supplying the second control signal to the air routing device to vary the speed of the device to vary the rate of flow of air in heat transfer relation with the evaporator; and monitoring the second control signal to determine the magnitude thereof to discontinue operation of the air conditioning system if the magnitude of the second control signal is indicative of the air temperature having decreased below a predetermined value.

6. In an air conditioning system including a mechanical refrigeration unit having a fan to route air in heat transfer relationship with the evaporator of said refrigerator unit to provide relatively cold air for a space being conditioned, and actuating means to drive said fan, the improvement of a control system comprising:

first temperature responsive means to sense the temperature of the refrigerant passing through the evaporator coil;

means to generate a first control signal in response to said sensed refrigerant temperature including means to vary the magnitude of said signal as the sensed refrigerant temperature varies;

second temperature responsive means to sense the temperature of the air in the space being conditioned;

means to generate a second control signal in response to said sensed air temperature, including means to vary the magnitude of said signal as the sensed air temperature varies; and comparative means to receive said first and second control signals and to select the control signal of the larger magnitude to supply said larger magnitude signal to said fan actuating means to vary the speed of said actuating means and thus the speed of said fan in response to the magnitude of said selected signal.

7. In an air conditioning system in accordance with claim 6 wherein the magnitude of said first signal increases as the temperature of the refrigerant decreases below a predetermined level.

8. In an air conditioning system in accordance with claim 7 wherein the magnitude of said second signal increases as the temperature of the air increases above a predetermined level.

9. In an air conditioning system in accordance with claim 6 wherein the magnitude of said second signal increases as the temperature of the air increases above a predetermined level.

10. A method of operating an air conditioning system including a mechanical refrigeration unit comprising the steps of:
routing air to be conditioned in heat transfer relation with the refrigerant flowing through the evaporator of the refrigeration unit, with the air rejecting heat to the refrigerant;
sensing the temperature of the air in a space being served by the system;
selectively increasing and decreasing the flow rate of air over the evaporator as the temperature of the sensed air respectively increases above or decreases below a first predetermined level;
sensing the temperature of the refrigerant flowing through the evaporator; and
increasing the flow rate of the air over the evaporator irrespective of the sensed air temperature if the temperature of the refrigerant decreases below a predetermined value.

11. A method in accordance with claim 10 wherein the compressor of the refrigeration unit is deenergized if the temperature of the sensed air decreases below a second predetermined level, the second predetermined level being below the first predetermined level.

* * * * *